United States Patent
Regalbuto et al.

(10) Patent No.: US 7,312,174 B2
(45) Date of Patent: Dec. 25, 2007

(54) METHOD FOR PREPARING HIGHLY LOADED, HIGHLY DISPERSED PLATINUM METAL ON A CARBON SUBSTRATE

(75) Inventors: John R. Regalbuto, Glenview, IL (US); Xianghong Hao, Chicago, IL (US)

(73) Assignee: The Board of Trustees of the University of Illinois, Chicago, IL (US)

( * ) Notice: Subject to any disclaimer, the term of this patent is extended or adjusted under 35 U.S.C. 154(b) by 793 days.

(21) Appl. No.: 10/657,649

(22) Filed: Sep. 8, 2003

(65) Prior Publication Data

US 2004/0116286 A1 Jun. 17, 2004

Related U.S. Application Data

(60) Provisional application No. 60/410,923, filed on Sep. 9, 2002.

(51) Int. Cl.
*H01M 4/88* (2006.01)
*H01M 4/00* (2006.01)
*B01J 21/18* (2006.01)
*B01J 23/40* (2006.01)

(52) U.S. Cl. .......... 502/185; 502/181; 429/40; 429/41; 429/42; 429/43; 429/44

(58) Field of Classification Search .......... 502/101, 502/185; 429/40–44
See application file for complete search history.

(56) References Cited

U.S. PATENT DOCUMENTS

| | | | |
|---|---|---|---|
| 4,044,193 A | 8/1977 | Petrow et al. | |
| 4,839,327 A | 6/1989 | Haruta et al. | 502/243 |
| 4,876,115 A | 10/1989 | Raistrick | 427/115 |
| 4,937,219 A | 6/1990 | Haruta et al. | 502/174 |
| 5,272,017 A | 12/1993 | Swathirajan et al. | 429/33 |
| 5,431,800 A | 7/1995 | Kirchoff et al. | 204/290 R |
| 5,561,000 A | 10/1996 | Dirven et al. | 429/42 |
| 5,882,810 A | 3/1999 | Mussell et al. | 429/33 |
| 6,417,133 B1 | 7/2002 | Ebner et al. | |
| 6,676,919 B1 * | 1/2004 | Fischer et al. | 423/584 |
| 2003/0047459 A1 * | 3/2003 | Timonov et al. | 205/170 |

(Continued)

FOREIGN PATENT DOCUMENTS

JP  2001-247546  * 9/2001

OTHER PUBLICATIONS

Cabot "XC72" Carbon Black webpage from www.cabot-corp.com website, date unknown.

(Continued)

*Primary Examiner*—J. A. Lorengo
*Assistant Examiner*—Patricia L. Hailey
(74) *Attorney, Agent, or Firm*—Greer, Burns & Crain, Ltd

(57) ABSTRACT

The invention is directed to a simple method for preparing highly dispersed, highly loaded platinum metal elements on various carbon substrates, including conductive carbon black, which is utilized in fuel cell electrodes. Utilizing carbon with a controlled point of zero charge (PZC) and maintaining a desired pH value throughout the adsorption of metal onto the carbon substrate, a high metal loading is achieved for a given surface area of the carbon substrate.

12 Claims, 3 Drawing Sheets

U.S. PATENT DOCUMENTS

2004/0100290 A1   5/2004   Pope et al. .................. 324/693

OTHER PUBLICATIONS

E-Tek Catalogue "Platinum on Carbon Catalysts" webpage from E-Tek website, date unknown.

Regalbuto et al. (1999) J. Cat., 184:335-34.
Spieker and Regalbuto (2001) Chem. Eng. Sci., 56:3491-3504.
Park and Regalbuto (1995) J. Coll. Interf. Sci., 175:239-252.
Watanabe et al. (1987) J. Electronal. Chem. 229: 395-406.

* cited by examiner

METHOD FOR PREPARING HIGHLY LOADED, HIGHLY DISPERSED PLATINUM METAL ON A CARBON SUBSTRATE

CROSS-REFERENCE TO RELATED APPLICATION

This application claims priority from Provisional Application Ser. No. 60/410,923 that was filed on Sep. 9, 2002.

GOVERNMENTAL SUPPORT

The present invention was made with the financial support of the National Science Foundation Grant CTS-9908181. The U.S. government has certain rights in this invention.

BACKGROUND OF THE INVENTION

The so-called "Platinum Metals" that constitute the heavier six of the nine Group VIII elements include platinum, ruthenium, osmium, rhodium, iridium and palladium. Although platinum and palladium are especially known for their reflectance and relative stability toward oxidation, each member of this group of elements is separately useful as a catalyst for chemical reactions, particularly oxidation-reduction reactions.

Illustratively, in many applications such as heterogeneous catalysts and fuel cell electrodes, small particles of platinum (Pt) are mounted, by numerous techniques, onto high surface area carbon "supports" or "substrates". There are myriad companies working toward the development of fuel cell components, and particularly fuel cell electrodes. A commonly cited electrode producer is E-TEK Corporation. Large catalyst manufacturers such as Engelhard and Johnson Matthey are also developing fuel cell components, and numerous smaller ones. Carbon supported Pt and palladium (Pd) catalysts are used extensively in the chemical process industry for hydrogenation reactions, and many other specialty applications. There is also much interest in Pt/carbon electrodes and catalysts in academia.

Because of its expense, it is usually desired to have Pt in the form of very small particles, which maximizes the amount of exposed Pt surface to increase catalytic activity. This condition is known as high "dispersion." Fuel cell applications require the use of high weight loadings of Pt at high dispersion. Present techniques have the ability to cause the deposit of large amounts of Pt onto high surface area carbon supports, but are cumbersome to use. Similar results are obtained using the other members of the platinum family of elements.

It would therefore be beneficial if a simple method could be found that permits preparation of high weight loadings of members of the platinum metal family of elements at high dispersion on to a high surface area carbon support. The disclosure that follows provides one such method.

BRIEF SUMMARY OF THE INVENTION

The present invention contemplates a method that is more effective than current methods for preparing a highly dispersed, highly loaded platinum metal family member element such as platinum (Pt) on a carbon substrate such as conductive carbon black, which is commonly utilized in fuel cell electrodes. Utilizing carbon with a controlled point of zero charge (PZC) and maintaining a desired pH value throughout the adsorption of Pt or other metal onto the carbon substrate a high loading for a given surface area of the carbon substrate can be obtained.

More specifically, a method for preparing particles of a platinum metal element on a carbon substrate is contemplated. That method comprises the steps of: (a) contacting a carbon substrate with an aqueous solution of a dissolved platinum metal element complex present at a pH value of about 2 to about 4 where said platinum metal element is present as an anionic complex and at a pH value of about 10.5 to about 13 where said platinum metal element is present as a cationic complex. The use of a carbon substrate having a higher PZC value at the low pH values or a carbon substrate having a lower PZC at the high pH values provides greater adsorption of the platinum metal element complex than the reverse usage; i.e., than compared to usage of a carbon substrate having a lower PZC at the low pH values or a carbon substrate having a higher PZC at the high pH values. (b) The contact is maintained at those pH values for a time period sufficient for the platinum metal element complex to adsorb onto the substrate to form a platinum metal complex-loaded substrate. (c) The platinum metal complex-loaded substrate is heated, preferably at a temperature of about 200° to about 300° C. under reducing conditions (e.g., in the presence of hydrogen) to form particles of a platinum metal element on the carbon substrate. The platinum metal particles so formed are preferably about 15 to about 25 Å across (in diameter) as determined by extended X-ray absorbance fine structure (EXAFS) measurements.

BRIEF DESCRIPTION OF THE DRAWINGS

In the drawings forming a portion of this disclosure.

Figure 1:
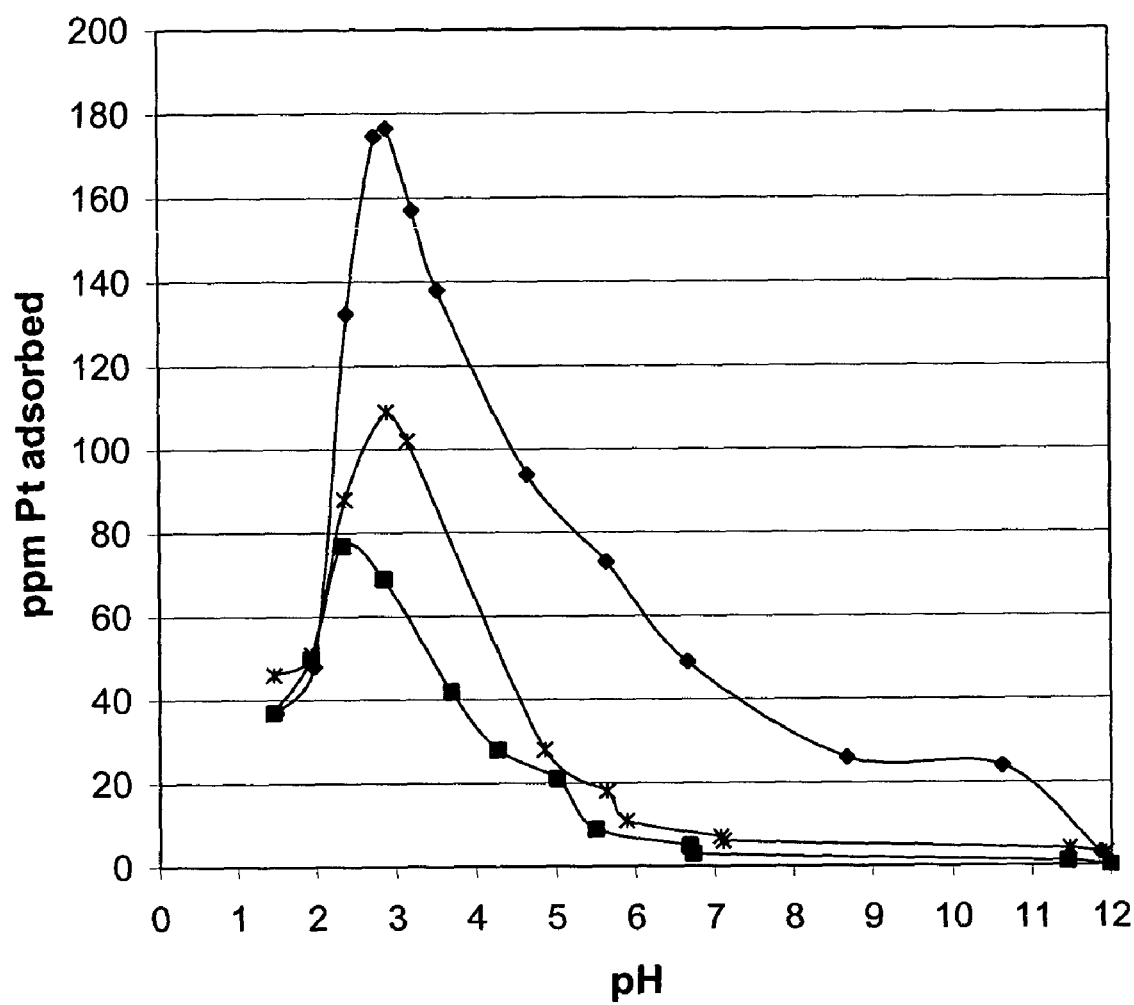
FIG. 1 is a graph illustrating the amount of adsorbed platinum versus pH value for activated carbons having different points of zero charge (PZC) in which: diamonds are for Norit SX Ultra (PZC=9; 1200 $m^2/g$), squares are for Norit CA-1 (PZC=2.5; 1400 $m^2/g$) and X's are for Norit KB-B (PZC=5; 1500 $m^2/g$)

The present invention has several benefits and advantages.

A particular benefit of the invention is that using its method, one can readily prepare a highly dispersed, highly loaded platinum metal family member upon a carbon substrate.

An advantage of the invention is that its method provides a means for preparing a fuel cell electrode.

Another benefit of the invention is that the platinum-coated carbon surfaces can be prepared at relatively low cost and high yield.

Another advantage of the invention is that a controlled, amount of platinum metal can be deposited upon the carbon support based on the pH value of the aqueous solution from which deposition occurs.

A still further benefit of the invention is that the platinum metal complex-loaded substrate need not be calcined prior to being reduced to form metal particles.

Still further benefits and advantages will be apparent to the skilled worker from the disclosure that follows.

DETAILED DESCRIPTION OF THE INVENTION

For the purpose of promoting an understanding of the principles of the invention, references will be made to the graphical data illustrated in the drawings. It will, nevertheless, be understood that no limitations of the scope of the invention is thereby intended, such alterations and further modifications in the described method, and such further applications of the principles of the invention herein being contemplated as would normally occur to one skilled in the art to which the invention relates.

In many applications such as heterogeneous catalysts and fuel cell electrodes, small particles of a platinum metal element are mounted, by numerous techniques, onto high surface area carbon "supports" or "substrates". The present invention contemplates a method for preparing highly dispersed, highly loaded platinum metal particles on various carbon substrates, including conductive carbon black, such as that commonly utilized in fuel cell electrodes. The phrase "highly dispersed platinum metal element" refers to the fraction of metal atoms that are in contact with the carbon support surface such that the larger the fraction or percentage, the larger the number of atoms and therefore metal particles that are in contact with the surface. The present method is more effective than current methods.

The work on carbon, as presented herein, is an unexpected result of an extension of studies of noble metal catalyst impregnation in which the adsorption of noble metal complexes of Pt(IV), Pt(II), Au(III), and Pd(II) onto alumina and silica supports were examined. Representative disclosures relating to those studies are reported in Regalbuto et al. (1999) *J. Cat.*, 184:335-34; and Spieker and Regalbuto (2001) *Chem. Eng. Sci.*, 56:3491-3504. The adsorption process in those systems is essentially electrostatic. Anionic noble metal complexes are strongly adsorbed over a support surface that is positively charged, and cationic complexes are adsorbed over negatively charged surfaces.

Oxide, as above, and carbon surfaces can attain a charge due to the presence, at the surface of each solid, of hydroxyl (—OH) groups. These groups predominate at a characteristic pH value, termed the point of zero charge (PZC) of the solid material. [See, Park and Regalbuto (1995) *J. Coll. Interf. Sci.*, 175:239-252] and the citations therein for determination of PZC values.] The supports become protonated and so positively charged (—$OH_2^+$) in the pH range below the solid PZC, and deprotonated and negatively charged (—$O^-$), at pH values higher than the PZC.

Accordingly, a method for preparing particles of a platinum metal element on a carbon substrate is contemplated. That method comprises the steps of: contacting a carbon substrate with an aqueous solution of a dissolved platinum metal element complex present at a pH value of about 2 to about 4 where said platinum metal element is present as an anionic complex and at a pH value of about 10.5 to about 13 where said platinum metal element is present as a cationic complex. Contacting is typically effected by admixture and stirring or shaking.

Exemplary platinum metal element complexes include the complexes of platinum, palladium, osmium, ruthenium, rhodium, and iridium. Specific anionic complexes include the halides (chlorides, bromides and iodides) and halohydroxoaquo forms, and particularly the chloro and chlorohydroxoaquo complexes such as $PtCl_4^{2-}$, $PtCl_6^{2-}$, $PtCl_5^{2-}$, $PdCl_4^{2-}$, $[RhCl_4(H_2O)_2]^-$, $[RhCl_5(H_2O)]^{2-}$, $[IrCl_5(H_2O)]^-$, $RhCl_6^{3-}$, $IrCl_6^{3-}$, $OsCl_6^{2-}$, and $[RuCl_4(H_2O)_2]^-$. Cationic complexes typically include one or more nitrogen atoms contained in a monodentate, bidentate or tridentate ligand such as ammine ($NH_3$), pyridine (py), ethylenediamine (en), 1,3-propanediamine (pn), 1,10-phenanthroline (phen), 2,2'-bypyridine (bipy) or diethylenetriamine (dien) and can also include aquo ($H_2O$) ligands to form an amminoaquo complex. Specific cationic complexes include [Ru $(NH_3)_5(H_2O)]^{2+}$, $[Ru(NH_3)_5(H_2O)]^{3+}$, $[Ru(bipy)_3]^{2+}$, $[Os(bipy)_3]^{2+}$, $Rh(NH_3)_6^{3+}$, Ir $(NH_3)_6^{3+}$, $Pd(NH_3)_4^{2+}$, $Pt(en)^{2+}$, $Pd(py)_2^{2+}$, and $[Pt(en)_2]^{2+}$. The concentration of platinum metal element complex in solution is about $10^{-4}$ to about to the greater of about 1 molar or the limit of solubility, and more preferably about $10^{-3}$ to about $10^{-1}$ molar.

The use of a carbon substrate having a higher PZC value at the low pH values or a carbon substrate having a lower PZC at the high pH values provides greater adsorption of the platinum metal element complex than the reverse usage; i.e., than compared to usage of a carbon substrate having a lower PZC at the low pH values or a carbon substrate having a higher PZC at the high pH values. Put differently, use of a substrate having a lower PZC value at a recited acid pH value leads to less adsorbed anionic platinum metal complex. Use of a carbon substrate having a higher PZC value at the recited basic pH values leads to similarly lessened adsorption of a cationic complex.

A contemplated carbon substrate has a surface area of about 100 to about 2500 $m^2/g$. Illustrative carbon substrates having varying surface areas and PZC values are available commercially from a number of sources such as E-TEK (Somerset, N.J., USA), Cabot Corporation (Alpharetta, Ga. USA), Ensaco™ 350 from Earchem Europe S.A. (Belgium), TIMCAL America (Westlake, Ohio. USA) and Norit Americas (Atlanta, Ga., USA). Exemplary carbon substrates and their PZC and surface area values are provided in the table below.

| Carbon Substrate | Surface Area ($m^2/g$) | PZC Value |
|---|---|---|
| Timcal TIMREX ™ | 300 | 4.8 |
| Cabot Vulcan XC-72 | 254 | About 8.5 |
| Ensaco ™ 350 | 770 | More than 9.0 |
| Norit SX Ultra2 | 1200 | 9.0 |
| Norit KB-B | 1500 | 5.0 |
| Norit CA1 | 1400 | 2.5 |

The contact is maintained at those pH values for a time period sufficient for the platinum metal element complex to adsorb onto the substrate to form a platinum metal complex-loaded substrate. The presence of the carbon substrate in the liquid solution can cause a pH value shift, so the pH value is monitored and further solution added to maintain the desired pH value. Typically, the ratio of water solution to carbon is greater than that required to merely fill the pores of the carbon substrate. The maintenance time can be from about 15 minutes to about 24 to 48 hours, but is typically about one hour to about 3 hours at room temperature.

The platinum metal complex-loaded substrate so formed is heated, preferably at a temperature of about 200° to about 300° C. and more preferably at a temperature of about 225° to about 250° C. under reducing conditions (e.g., in the presence of hydrogen or other convenient reducing agent) to form particles of a platinum metal element on the carbon substrate. The platinum metal particles so formed are preferably about 15 to about 25 Å across (in diameter) as determined by extended X-ray absorbance fine structure (EXAFS) measurements, and are more preferably about 15 to about 20 Å across.

Unexpectedly and unlike like alumina and silica supports, carbons with different PZC values can be produced, as is noted and seen in the table above. Different pH values can be used to control or adjust the uptake amount of a particular metal ion complex for carbon supports having a given PZC value. The different PZC values can be used to control the uptake of a particular metal complex at a given pH.

The first evidence that the uptake of Pt (an illustrative platinum metal element family member) onto carbon supports of different PZC can be controlled is illustrated in FIG. 1. Thus, FIG. 1 shows the amount of platinum adsorbed in ppm over 500 $m^2$ carbon/(liter of solution) at various pH values for three different activated carbons.

Details of the most common electrode preparation method can be found in U.S. Pat. No. 4,044,193 and Watanabe et al. (1987) *J. Electronal. Chem.* 229:395-406. That method of electro preparation includes up to eight separate and cumbersome steps involving Pt sulfite complexes and sols. In contrast, the present method contains only one step in place of the eight, and can utilize the most common source for dissolved platinum, chloroplatinic acid (CPA) or another readily available water-soluble platinum metal element family member salt or complex.

The synthetic method used for those studies is described hereinbelow.

EXAMPLE 1

Chloropantinic Acid (CPA) Over Carbon: Synthetic Procedures

In adsorption studies, the amount of carbon needed to provide 500 $m^2$ of surface area in 50 milliliters of CPA solution is calculated as follows:

$$M = \frac{SL * V}{SA}$$

in which:
M is the mass of the carbon needed, (g),
SL is the surface loading, in this case, 500 $m^2$/L,
SA is the surface area of carbon ($m^2$/g),
V is the volume of the CPA solution, 0.05 L.

For example, the amount of Norit® CA1 (1400 $m^2$/g) charcoal powder needed would be:

$$\frac{500 \ (m^2/L) * 0.050 \ (L)}{1400 \ (m^2/g)} = 0.01786 \ (g)$$

Fifty milliliters of dilute CPA (close to 200 ppm Pt or $1.02 \times 10^{-3}$ M) is adjusted to various pH values using HCl or NaOH. The pH of aged 200 ppm CPA solution is about 2.40. For more acidic solutions, HCl is added in the appropriate amount. For more basic pH values, due to the hydrolysis of CPA and the associated decreases in pH, a complex procedure is needed.

Different amounts of NaOH (1M) are added to get a pH values ranging from 2.7 to 12. For example, from test studies, adding 140 µL of NaOH provides an aged pH of 3.0, and adding 160 µL of NaOH provides an aged pH of 10.0. In order to get the pH values in between, equal fractions of the base between 140 and 160 µL were added to the CPA samples for a total of about 20 bottles of CPA. These samples were aged 48 hours such that pH (and hydrolysis) was constant.

pH Adjustment was also required. If the final pH values of these solutions were not well-spaced, bottles of higher and lower pH CPA solutions were mixed in order to obtain pH values in between. This is done, as opposed to adding more acid or base, in order to maintain a low ionic strength. For example, if a pH value of 5 is needed, a pH 4 CPA solution can be mixed with a proportionate amount of a pH 9 sample. After the pH adjustment, the samples were aged for another 42-48 hours.

The CPA samples adjusted to different pH values were then added to carbon powders previously weighed into polypropylene bottles. The bottles were placed on a shaker and intermittently sampled for pH. At 1 or 24 hours, 3 to 4 mL portions of well-mixed suspensions are removed from the bottles and the solid filtered to permit measurement of Pt concentrations in the liquid phase by inductively coupled plasma spectroscopy (ICP). Adsorption density was calculated as the initial minimum final concentration of Pt divided by the surface loading, and is expressed as micromoles Pt adsorbed per square meter.

The uptake of the anionic Pt complexes was highest for the carbon with the highest PZC, because the carbon acquires the highest positive charge at low pH. The carbon with the lowest PZC has the lowest charge and adsorbs the least amount of anionic Pt at low pH values.

The maximum uptake of Pt, about 180 ppm, corresponds to a surface coverage of about 1.6 µmole/$m^2$. That value can be converted to a Pt loading using the specific surface area of the carbon, which is about 1400 $m^2$/gm to provide a Pt loading of 50.4 weight percent (wt %).

Figure 3:
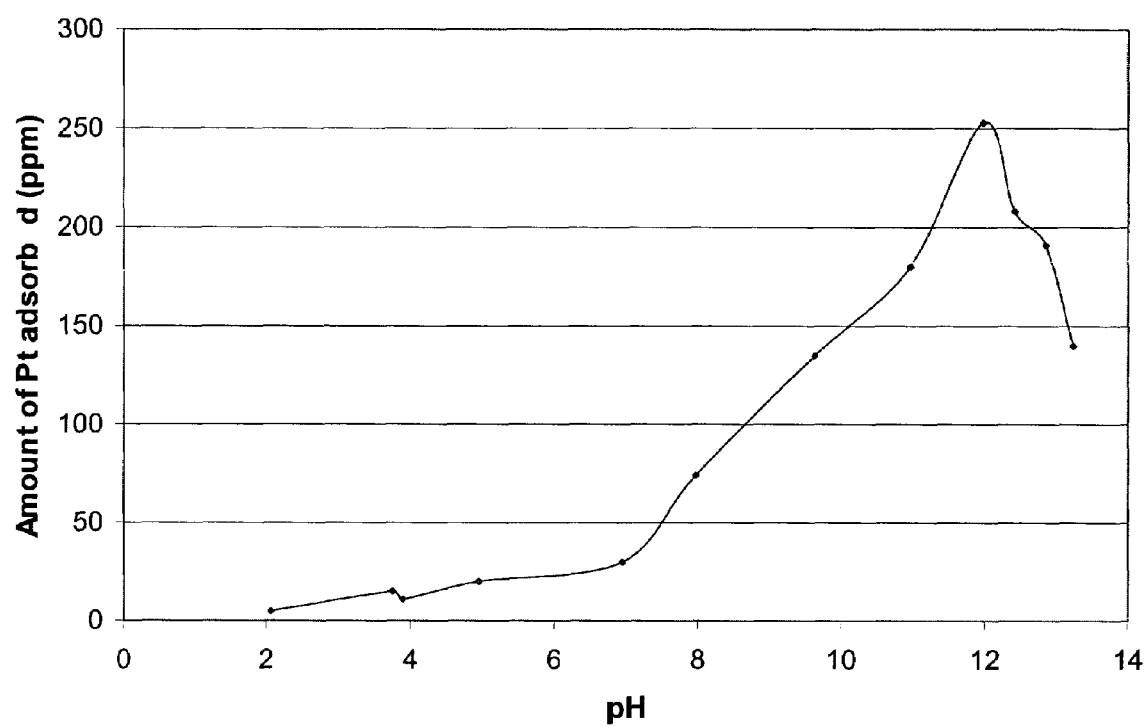
FIG. 3 is a graph illustrating the uptake of platinum tetraammine versus pH over a high surface area of graphite (Timcal TIMREX, PZC=4.8; 300 $m^2/g$).

Studies have also been conducted experiments in the basic pH range, using a cationic form of Pt complex, and the results are analogous. In that case, the carbon with the highest PZC adsorbed the least amount of cationic Pt, whereas that with the lowest PZC adsorbed the greatest amount of cationic Pt. In addition to the three activated carbons shown in FIG. 1, a high surface area graphite was also assayed at high pH, and it also followed an electrostatic mechanism. The maximum uptake of Pt illustrated in FIG. 3 from the tetraammine cationic complex adsorbed on to a graphite (Timcal TIMREX) having a surface area of 300 $m^2$/g and a PZC of 4.8 corresponds to about 0.8 µmole/$m^2$.

Carbon black, the high surface area, conductive form of carbon used for fuel cell electrodes, behaves similarly. A sample of the carbon black used most widely for fuel cell electrodes, Cabot's Vulcan® XC-72 was obtained. Information on Vulcan® XC-72 carbon and the typical electrodes made from it (E-TEK electrodes) are available from Cabot and E-Tek corporations. The PZC of Vulcan® XC-72 is approximately 8.5. When the adsorption of anionic Pt onto Vulcan® XC-72 was studied, the results were similar to the activated carbon with a similar PZC. The uptake of Pt over Vulcan® XC-72 versus pH is illustrated in FIG. 2.

Figure 2:
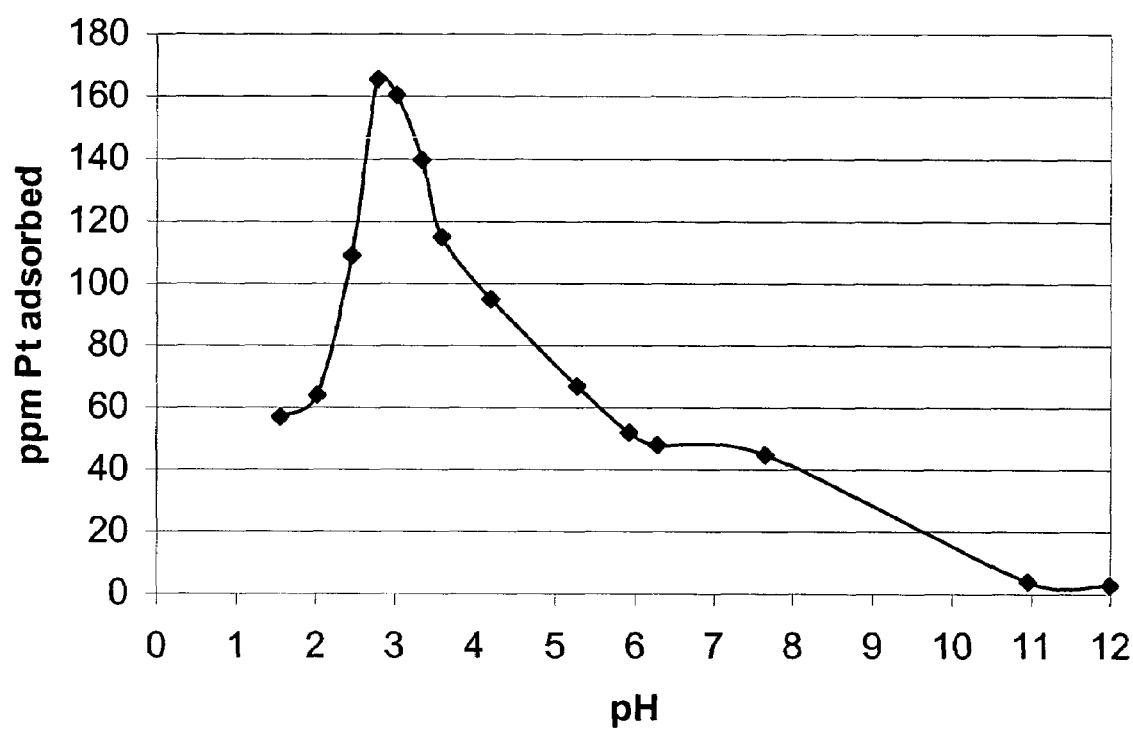
FIG. 2 is a graph illustrating the uptake of platinum versus pH by Vulcan® XC 72 carbon black (PZC=8.5, $m^2/g$)

FIG. 2 illustrates that the strongest adsorption of Pt over Vulcan® XC-72 is achieved at an equilibrium pH value of about 3. Because 500 $m^2$ of carbon/liter of solution was used for this study, and because the uptake of Pt was again about 170 ppm, the surface coverage was also 1.6 pmoles/$m^2$. The specific surface area of Vulcan® XC-72 is 254 $m^2$/gm such that the maximum Pt loading is 9.4 wt %, which is still quite satisfactory for fuel cell applications. Should higher Pt loading be desired, carbon black with a higher surface area can be utilized. For example, Ensaco™ 350 from Earchem Europe S.A. has a surface area of 770 $m^2$/gm (and has a PZC above 9.0). At 1.6 µmoles Pt/$m^2$, this produces a maximum weight loading of 28%.

Using the disclosed methodology, Pt can be adsorbed over the commercially preferred carbon black for fuel cell electrodes, at high loading and with high dispersion. The metal is present at this stage, however, as a coordination complex, such as $[PtCl_6]^{-2}$. For use as an electrode or a catalyst, the ligands of the coordination complex should be removed and the metal should be reduced to its elemental state. In the catalysis industry, this is commonly called "catalyst pretreatment" or "catalyst finishing", and typically consists of a high temperature oxidation (in air; calcining) followed by a high temperature reduction (in hydrogen). Contrary to other supports, it is not necessary to carry out a calcining step when using a carbon support.

High dispersion obtained through the adsorption process disclosed herein is maintained during the catalyst pretreatment steps. Both alumina and silica supports onto which the Pt has been strongly adsorbed retain dispersion, which also holds true for carbon.

If the pH buffering effect of the support is not accounted for in the catalyst impregnation procedure (see the Watanabe et al. paper, elsewhere herein), there can be insufficient charge on the support and weak adsorption. This effect is controlled by using an excess of liquid, such that the pH shift caused by the addition of the solid is minimized, and through which final pH can be controlled. On the acid side, unless the final pH value is significantly below the support PZC, strong adsorption does not occur, as shown in FIGS. 1 and 2. Similarly on the basic side, adsorption is strongest at a pH value greater than the support PZC value.

The results of utilizing the disclosed method for adsorption of a platinum metal element produces a higher loaded, more highly dispersed, better performing electrode/catalyst through a cost effective process.

Each of the patents and articles cited herein is incorporated by reference. The use of the article "a" or "an" is intended to include one or more.

The foregoing description and the examples are intended as illustrative and are not to be taken as limiting. Still other variations within the spirit and scope of this invention are possible and will readily present themselves to those skilled in the art.

What is claimed:

1. A method for preparing particles of a platinum metal element on a carbon substrate that comprises the steps of:
   (a) contacting a carbon substrate having a surface area of about 100 to about 2500 m.sup.2/g with an aqueous solution of a dissolved platinum metal element complex present at a pH value of about 2 to about 4 where said platinum metal element is present as an anionic complex and at a pH value of about 10.5 to about 13 where said platinum metal element is present as a cationic complex, whereby said carbon substrate has a higher PZC value at said low pH values or said carbon substrate has a lower PZC at said high pH values provides greater adsorption of said platinum metal element complex than the reverse usage;
   (b) maintaining said contact at said pH value for a time period sufficient for said platinum metal element complex to adsorb onto said substrate to form a platinum metal complex-loaded substrate;
   (c) heating said platinum metal complex-loaded substrate under reducing conditions to form particles of a platinum metal element on said carbon substrate.

2. The method according to claim 1 wherein said platinum metal complex-loaded substrate is heated at a temperature of about 200.degree. to about 300.degree. C.

3. The method according to claim 1 wherein said anionic complex is a halo or halohydroxoaquo complex.

4. The method according to claim 1 wherein said cationic complex comprises one or more nitrogen atoms contained in a monodentate, bidentate or tridentate ligand.

5. A method for preparing particles of a platinum metal element on a carbon substrate that comprises the steps of:
   (a) contacting a carbon substrate having a surface area of about 100 to about 2500 m.sup.2/g with an aqueous solution of a dissolved platinum metal element complex present at a pH value of about 2 to about 4 where said platinum metal element is present as an anionic complex, whereby said carbon substrate has a higher PZC value at said pH values provides greater adsorption of said platinum metal element complex than does use of a substrate having a lower PZC value;
   (b) maintaining said contact at said pH value for a time period sufficient for said platinum metal element complex to adsorb onto said substrate to form a platinum metal complex-loaded substrate;
   (c) heating said platinum metal complex-loaded substrate under reducing conditions at a temperature of about 200.degree. to about 300.degree. C. to form particles of a platinum metal element on said carbon substrate.

6. The method according to claim 5 wherein said anionic complex is a halo or halohydroxoaquo complex.

7. The method according to claim 6 wherein said halo or haloaquo complex is a chloro or chlorohydroxoaquo complex.

8. The method according to claim 7 wherein said chloro or chlorohydroxoaquo complex is selected from the group consisting of $PtCl_4^{2-}$, $PtCl_6^{2-}$, $PtCl_5^{2-}$, $PdCl_4^{2-}$, $[RhCl_4(H_2O)_2]^-$, $[RhCl_5(H_2O)]^{2-}$, $[IrCl_5(H_2O)]^-$, $RhCl_6^{3-}$, $IrCl_6^{3-}$, $OsCl_6^{2-}$ and $[RuCl_4(H_2O)_2]^-$.

9. A method for preparing particles of a platinum metal element on a carbon substrate that comprises the steps of:
   (a) contacting a carbon substrate having a surface area of about 100 to about 2500 m.sup.2/g with an aqueous solution of a dissolved platinum metal element complex present as a cationic complex at a pH value of about 10.5 to about 13, whereby said carbon substrate has a lower PZC at said pH value provides greater adsorption of said platinum metal element complex than does use of a substrate having a higher PZC;
   (b) maintaining said contact at said pH value for a time period sufficient for said platinum metal element complex to adsorb onto said substrate to form a platinum metal complex-loaded substrate;
   (c) heating said platinum metal complex-loaded substrate under reducing conditions at a temperature of about 200 degrees to about 300 degrees C. to form particles of a platinum metal element on said carbon substrate.

10. The method according to claim 9 wherein said cationic complexes includes one or more nitrogen atoms contained in a monodentate, bidentate or tridentate ligand, or said one or more nitrogen atoms and water from an amminoaquo complex.

11. The method according to claim 10 wherein said cationic complex containing a monodentate, bidentate or tridentate ligand is an ammine, pyridine, ethylenediamine, 1,3-propanediamine, 1,10-phenanthroline, 2,2'-bypyridine or diethylenetriamine ligand.

12. The method according to claim 11 wherein said ammine-containing cationic complex is selected from the group consisting of $Ru(NH_3)_5(H_2O)]^{2+}$, $[Ru(NH_3)_5(H_2O)]^{3+}$, $[Ru(bipy)_3]^{2+}$, $[Os(bipy)_3]^{2+}$, $Rh(NH_3)_6^{3+}$, $Ir(NH_3)_6^{3+}$, $Pd(NH_3)_4^{2+}$, $Pt(en)^{2+}$, $Pd(py)_2^{2+}$, and $[Pt(en)_2]^{2+}$.

* * * * *

UNITED STATES PATENT AND TRADEMARK OFFICE
CERTIFICATE OF CORRECTION

PATENT NO. : 7,312,174 B2 Page 1 of 1
APPLICATION NO. : 10/657649
DATED : December 25, 2007
INVENTOR(S) : Regalbuto et al.

It is certified that error appears in the above-identified patent and that said Letters Patent is hereby corrected as shown below:

In the Specification:

Col. 6, line 59  Please delete "pmoles/m$^2$" and insert --µmoles/m$^2$-- in its place.

Signed and Sealed this

Second Day of June, 2009

JOHN DOLL
*Acting Director of the United States Patent and Trademark Office*